US011975580B2

(12) United States Patent
Bharani

(10) Patent No.: US 11,975,580 B2
(45) Date of Patent: May 7, 2024

(54) JOINED AUTOMOBILE

(71) Applicant: Madurai Bharani, Rolling Meadows, IL (US)

(72) Inventor: Madurai Bharani, Rolling Meadows, IL (US)

(*) Notice: Subject to any disclaimer, the term of this patent is extended or adjusted under 35 U.S.C. 154(b) by 912 days.

(21) Appl. No.: 16/993,059

(22) Filed: Aug. 13, 2020

(65) Prior Publication Data

US 2020/0369103 A1 Nov. 26, 2020

Related U.S. Application Data

(63) Continuation of application No. 15/194,501, filed on Jun. 27, 2016, now abandoned.

(60) Provisional application No. 62/258,457, filed on Nov. 21, 2015.

(51) Int. Cl.
*B60D 5/00* (2006.01)
*B62D 47/00* (2006.01)

(52) U.S. Cl.
CPC ............ *B60D 5/00* (2013.01); *B62D 47/006* (2013.01)

(58) Field of Classification Search
CPC ............................... B60D 5/00; B62D 47/006
See application file for complete search history.

(56) References Cited

U.S. PATENT DOCUMENTS

| | | | | |
|---|---|---|---|---|
| 4,361,200 | A | 11/1982 | Igarashi | 180/11 |
| 4,596,192 | A | 6/1986 | Forster | 104/118 |
| 7,017,690 | B2 | 3/2006 | Burke | 180/24.07 |
| 2007/0296180 | A1* | 12/2007 | Scharf | B60D 5/00 280/408 |
| 2009/0071074 | A1 | 3/2009 | Yates | 49/55 |

FOREIGN PATENT DOCUMENTS

| | | | |
|---|---|---|---|
| EP | 1864833 A1 * | 12/2007 | B60D 5/00 |

* cited by examiner

*Primary Examiner* — Rick K Chang
(74) *Attorney, Agent, or Firm* — Stein IP, LLC

(57) ABSTRACT

Joined automobiles are disclosed. Two separate joinable automobiles, each with its own control system, powertrain, and interior space, can be joined by means of built-in retractable coupling systems, providing a single joined automobile with a contiguous inner space, two powertrains which can be used singly or together, and two control systems. The coupling systems can be used by putting the automobiles in proximity to each other and engaging them, and/or disengaging them for separate use.

2 Claims, 1 Drawing Sheet

JOINED AUTOMOBILE

CROSS-REFERENCE TO RELATED APPLICATION AND INCORPORATION BY REFERENCE

This application claims priority to the previously filed United States of America Patent Application with an application number of Ser. No. 15/194,501 titled JOINING AUTOMOBILES, with an application filing date of Jun. 27, 2016, in the United States Patent and Trademark Office, said application by the same inventive entity, with the entirety of said application being incorporated herein by reference to provide continuity of disclosure. Through the previously identified patent, this application also claims priority to U.S. Provisional Patent Application 62/258,457, also entitled JOINING AUTOMOBILES, filed Nov. 21, 2015.

This application is a CONTINUATION of the previously-filed application identified above and contains no new matter.

FIELD OF THE INVENTION

This invention relates generally to automobiles which can be driven independently as traditional automobiles, and also linked to form a single joined automobile which has a contiguous inner space and utilizes the powertrains and control systems of one or both of the joinable automobiles to make the joined automobile more efficient, more economical to operate, and/or increase its carrying capacity and power.

BACKGROUND OF THE INVENTION

Traditional automobiles constitute a single frame with a single body mounted upon the single frame, having a single powertrain and a single set of controls, and a single inner space, which may be partially or entirely contiguous. While automobiles are one of the most successful technological innovations in the history of humankind, traditional automobiles still suffer from various limitations which new configurations and types of automobiles can overcome or improve upon.

One of the primary limitations of traditional automobiles is that once the single frame/body is assembled, expanding the space available in the automobile, or adding additional power or suspension capability, is nearly impossible without major mechanical rework. In the past, various methods have been used to try to overcome this limitation.

As a first example, U.S. Pat. No. 4,361,200 to Igarishi ("Igarishi") teaches a method of removing a section from a first automobile and adding it to a second automobile to create a joined automobile. However, Igarishi requires disassembly and reassembly of the automobiles both to use them as a joined automobile and to then separate and use them as separate automobiles again. Automobiles that could be joined to use as a joined automobile and then un-joined to use as separate automobiles quickly and easily without assembly or disassembly would be a useful invention.

As a second example, U.S. Pat. No. 4,596,192 to Forster ("Forster") teaches a method of joining two automobiles (as shown in Forster, large passenger buses) to form a joined automobile. However, Forster requires significant and complex joining mechanisms to join the automobiles. Automobiles that could be joined to use as a joined automobile without the addition of a significant and complex additional mechanism and then un-joined to use as separate automobiles without requiring the removal and storage of such additional mechanism would be a useful invention.

The present invention addresses these concerns.

SUMMARY OF THE INVENTION

An objective of the present invention is the provision of a joined automobile that can be used as a single joined automobile with a contiguous inner space or as separate automobiles.

A second objective of the present invention is the provision of a joined automobile that can be simply, easily and quickly formed by joining two joinable automobiles to form a single joined automobile and simply, easily and quickly un-joined to form separate automobiles again.

A third objective of the present invention is the provision of a joined automobile that can be formed by joining two joinable automobiles without requiring any separate or additional mechanism or means other than those present in the joinable automobiles.

A fourth objective of the present invention is the provision of a joined automobile formed of two joinable automobiles which can carry larger and/or heavier objects than the individual joined automobiles.

These and other objectives of the present invention (which other objectives become clear by consideration of the specification, claims, and drawings as a whole) are met by joinable automobiles as set forth in the description of the preferred embodiment.

BRIEF DESCRIPTION OF THE DRAWINGS

Throughout the figures of the drawings, where the same or similar part appears in one or more than one figure of the drawings, the same or similar number is applied thereto.

DETAILED DESCRIPTION OF THE PREFERRED EMBODIMENTS

Figure 1:
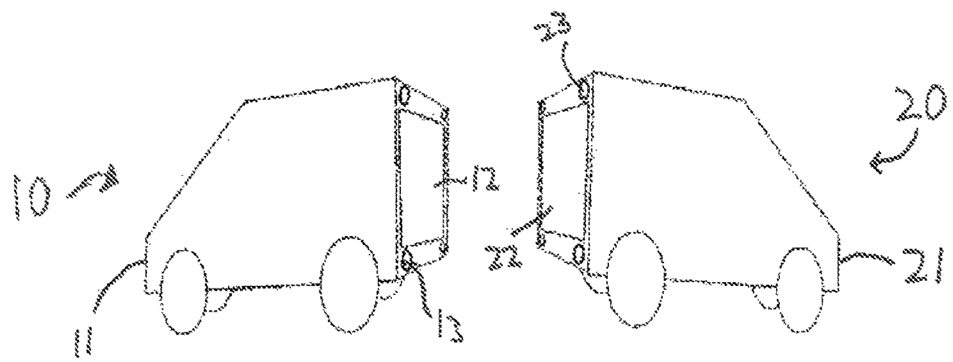
FIG. 1 depicts an abstracted perspective view of the joinable automobiles in their separate use configuration.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Figure 2:
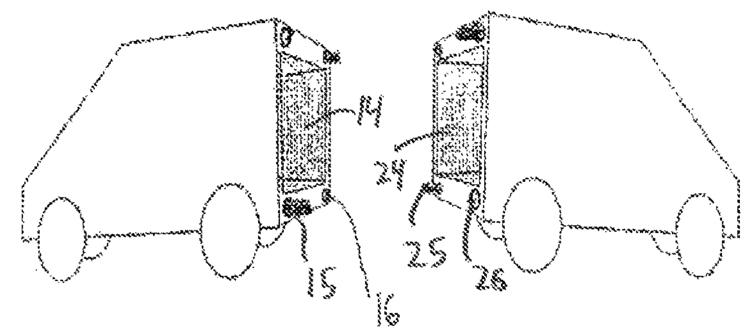
FIG. 2 depicts an abstracted perspective view of the joinable automobiles in a configuration ready for joining.

By referring to FIGS. 1 and 2, the basic function of the invention may be easily understood. First joinable automobile 10 includes first chassis 11 and first rear door 12. In the single-automobile configuration shown in FIG. 1, all of the first joining elements 13 (see FIG. 2 and FIG. 4) are retracted. Similarly, second joinable automobile 20 includes second chassis 21 and second rear door 22. In the single-automobile configuration shown in FIG. 1, all of the second joining elements 23 (see FIG. 2 and FIG. 4) are retracted.

Note that it is preferred, but not required, to have some kind of cover, whether it be a foldable door, a removeable cap, or any other reasonable covering means or device, that covers the joining elements when the joinable automobile is in single-automobile configuration as shown in FIG. 1. If there is no cover, it is preferred, but not required, that the joining elements present a relatively flush surface to keep out debris and to avoid being caught on things during operation of the automobile.

FIG. 2 shows the joinable automobiles in ready-to-join configuration. The first rear door has been opened to expose first interior space 14. First joining bolt 15 has been extended from the first chassis. First joining bolt receiver 16 is ready to receive a joining bolt from the second joinable automobile. Similarly, the second rear door has been opened to expose second interior space 24. Second joining bolt 25 has been extended from the second chassis. Second joining bolt receiver 26 is ready to receive a joining bolt from the first joinable automobile.

Note that it is preferred, but not required, to have a joining bolt and/or receiver at each "corner" of the joinable automobile, as shown, but in FIG. 2 only the lower ones are labeled. It is strongly preferred, but not required, to configure the joining bolts and corresponding joining bolt receivers as shown for maximum stability and rigidity. A great advantage of the invention is that if the receiving elements are configured as shown, all the joinable automobiles of a particular type can be configured identically, and will automatically form mirror images of each other so that the bolts and receivers will be in corresponding positions when the joinable automobiles are back-to-back. It is not necessary to have a "left" and a "right" or a "front" and a "rear" joinable automobile with a corresponding "right," "left," "rear," or "front" joinable automobile and there will never be a situation where any two particular joinable automobiles of a given type will not join or where "gender-changing" adapters will be necessary.

Figure 3:
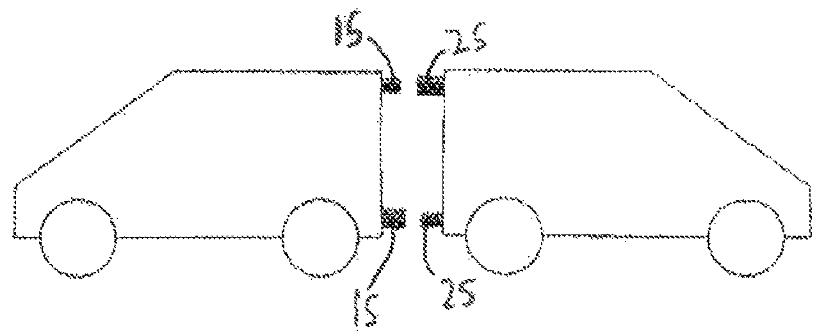
FIG. 3 depicts an abstracted side view of the joinable automobiles in a configuration ready for joining.
Figure 4:
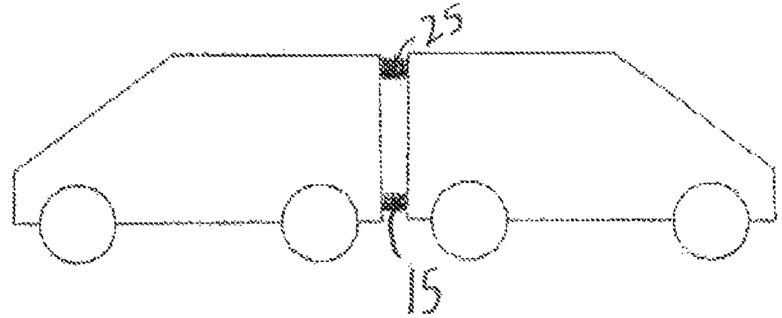
FIG. 4 depicts an abstracted side view of the joinable automobiles in a partial or intermediate state of joining.

FIGS. 3 and 4 show the joining process as it proceeds. First joining bolts 15 are fully extended and ready to be engaged with second joining bolt receivers 26 (not visible: see FIG. 2.) Second joining bolts 25 are likewise fully extended and ready to be engaged with first joining bolt receivers 16 (not visible: see FIG. 2.) In FIG. 3, the joinable automobiles are separated and ready for final alignment. In FIG. 4, the joining elements have been brought into proximity and final alignment and are ready to be screwed together or otherwise engaged as is reasonable and mechanically and structurally required.

Figure 5:
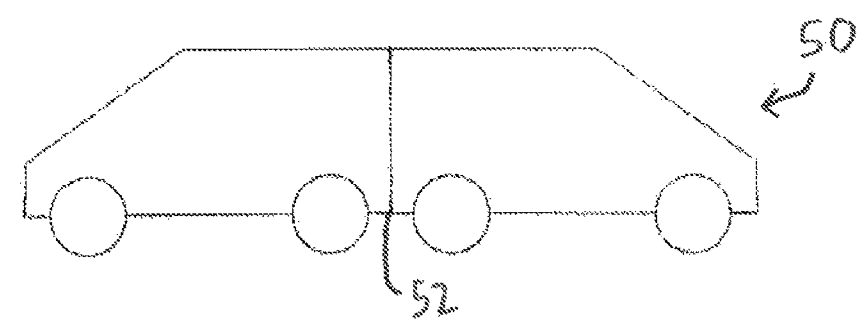
FIG. 5 depicts an abstracted side view of the joined automobile with a single contiguous inner space.

FIG. 5 shows joined automobile 50. The two joinable automobiles are now joined along seam 52. The interior spaces (not shown) are joined. As will be apparent from the preceding description, first interior space 14 and second interior space 24 are now contiguous, increasing total cargo volume capacity over either joinable automobile alone. This also allows passengers in one joinable automobile's volume to easily and safely transition to the volume of the other joinable automobile.

Since the joinable automobiles are symmetrical, the floors, walls and ceilings of the interior spaces are aligned in a flush and level manner. As is also apparent from the preceding description, the powertrains of both joinable automobiles are both contained in joined automobile and can be applied as necessary, increasing total horsepower and/or torque available over either joinable automobile alone. Further, as is apparent from the preceding description, the joined automobile is suspended from the suspension systems of both of the joinable automobiles, increasing total cargo weight capacity over either joinable automobile alone.

It is required that the rear of each joinable automobile be essentially planar as well as plumb and level with the surface the joinable automobiles rest upon. As is apparent, if this is not the case, the joinable automobiles will not join symmetrically and smoothly and the benefit of the invention will not be obtained. It is preferred, but not required, for there to be some elastic gasketing material (not shown) around the openings of the rear doors to form a weathertight seal and minimize airflow through the seam of the joined automobile.

It is required that there be some means of connecting the control systems of the joinable automobiles (not shown) so that when and as required the powertrains of each vehicle can be engaged by the operator of the joined automobile. It is optional, but neither preferred nor required, to actually mechanically link the drivetrains of the joinable automobiles. Whether or not the drivetrains are linked, as is apparent from the preceding description there is no "front" or preferred joinable automobile for the operator of the joined automobile to occupy, so the powertrain and fuel supply of both joined automobiles are available to extend the range of the joined automobile. If there is no mechanical linkage of the powertrains and/or fuel supplies, the operator need only pull over and switch from one joined automobile to the other to obtain the use of the powertrain and fuel supply of the other joined automobile.

This application—taken as a whole with the abstract, specification, claims, and drawings provides sufficient information for a person having ordinary skill in the art to practice the invention disclosed and claimed herein.

Any measures necessary to practice this invention are well within the skill of a person having ordinary skill in this art after that person has made a careful study of this disclosure.

Because of this disclosure and solely because of this disclosure, modification of this system and method can become clear to a person having ordinary skill in this particular art. Such modifications are clearly covered by this disclosure.

What is claimed and sought to be protected by Letters Patent is:

The invention claimed is:

1. A joined automobile, comprising:

a) a first joinable automobile having a first rear joinable surface having a first rear joining arrangement comprising at least two first joining bolts which can be extended from the first rear joinable surface and at least two first joining bolt receivers;

b) a second joinable automobile having a second rear joinable surface having a second rear joining arrangement comprising at least two first joining bolts which can be extended from the first rear joinable surface and at least two first joining bolt receivers at least two second joining bolt receivers, wherein the first rear joining arrangement and the second rear joining arrangement are horizontally and vertically reversed from each other when the first rear joinable surface and the second rear joinable surface are opposed to each other such that each of the at least two first joining bolts will be opposed to one of the at least two second joining bolt receivers and each of the at least two second joining bolts will be opposed to one of the first joining bolt receivers, and further wherein the at least two first joining bolts can be removably affixed to the at least two second joining bolt receivers and the at least two second joining bolts can be removably affixed to the at least two first joining bolt receivers such that the first joinable automobile and the second joinable automobile can be removably joined to form the joined automobile;

c) a first rear door which opens into a first interior space of the first joinable automobile and forms a first opening in the first rear joinable surface; and d) a second rear door which opens into a second interior space of the second joinable automobile and forms a second opening in the second rear joinable surface, such that when the first rear joinable surface and the second rear joinable surface are opposed to each other and the first rear door and the second rear door are both open, the first opening and the second opening are aligned and the first interior space and the second interior space form a joined interior space.

2. The joined automobile of claim 1, wherein the joined interior space is contiguous and can easily be traversed by one or more passengers.

* * * * *